US006956068B2

(12) United States Patent
Bufanda et al.

(10) Patent No.: US 6,956,068 B2
(45) Date of Patent: Oct. 18, 2005

(54) MICROCELLULAR FOAM DIELECTRIC FOR USE IN TRANSMISSION LINES

(75) Inventors: Daniel E. Bufanda, Burlington, CT (US); Karl Audenaerde, Eupen (BE)

(73) Assignee: Radio Frequency Systems, Inc., Meriden, CT (US)

( * ) Notice: Subject to any disclaimer, the term of this patent is extended or adjusted under 35 U.S.C. 154(b) by 91 days.

(21) Appl. No.: 10/197,570

(22) Filed: Jul. 18, 2002

(65) Prior Publication Data

US 2003/0087975 A1 May 8, 2003

Related U.S. Application Data

(63) Continuation of application No. PCT/US01/42914, filed on Nov. 5, 2001.
(51) Int. Cl.[7] .................................. C08J 9/00
(52) U.S. Cl. ..................... 521/79; 521/81; 521/134; 521/139; 174/68.1
(58) Field of Search ..................... 521/79, 81; 174/68.1

(56) References Cited

U.S. PATENT DOCUMENTS 5,614,319 A * 3/1997 Wessels et al. ............. 428/379

* cited by examiner

Primary Examiner—James J. Seidleck
Assistant Examiner—Irina S. Zemel
(74) Attorney, Agent, or Firm—Sughrue Mion, PLLC

(57) ABSTRACT

The present invention is directed to a novel foamed polymer material for use as a dielectric in electric transmission lines. The foam dielectric of the present invention is obtained from extrusion of a polymer alloy and a supercritical fluid, especially carbon dioxide. Specifically, the foam polymer dielectric is made by:

(1) feeding a polymer alloy into an extruder and heating the polymer alloy, (2) feeding a supercritical fluid into the extruder, (3) mixing the polymer alloy and the supercritical fluid, (4) exiting the polymer alloy and the supercritical fluid from the extruder, and (5) passing the polymer alloy and the supercritical fluid through a crosshead.

The foam dielectric of the present invention may be used in coaxial transmission lines. In this embodiment, an inner conductor is surrounded by the foam dielectric, which is further surrounded by a second conductor. Stripline and microstripline transmission lines may also be manufactured using the disclosed foam dielectric.

15 Claims, 9 Drawing Sheets

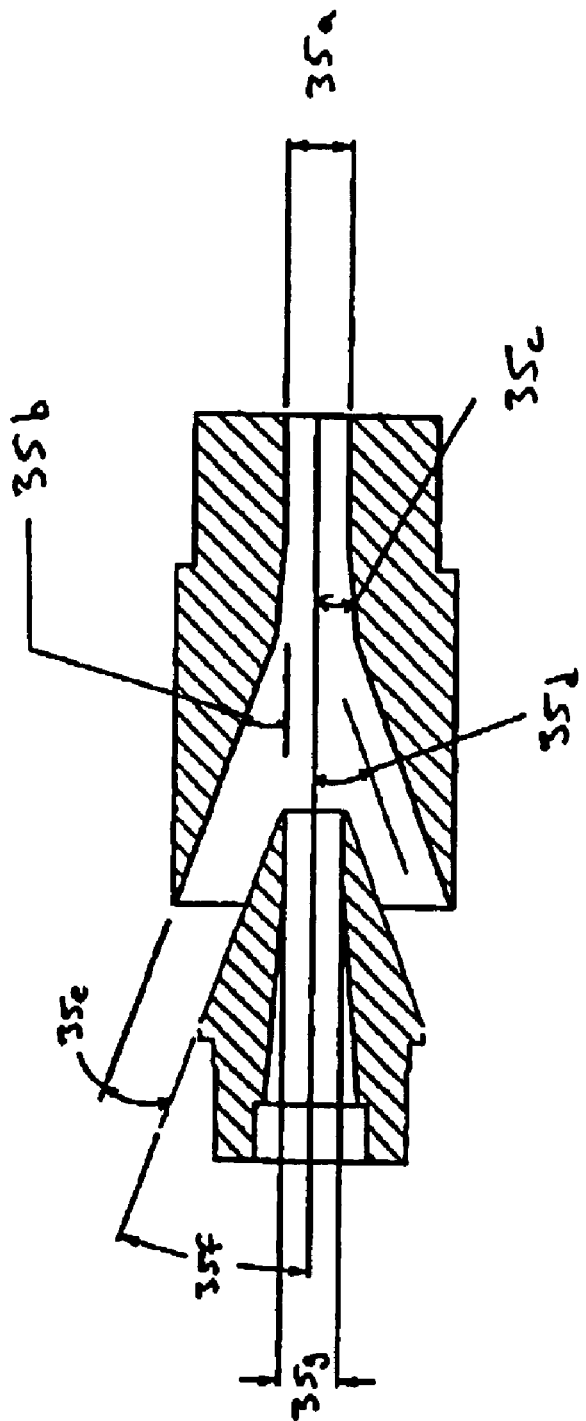

MICROCELLULAR FOAM DIELECTRIC FOR USE IN TRANSMISSION LINES

This is a continuation of PCT Application No. PCT/US 01/42914 filed Nov. 5, 2001; the disclosure of which is incorporated herein by reference.

FIELD OF THE INVENTION

The present invention relates to a microcellular foam polymer dielectric for use in transmission lines, for example, a coaxial RF cable or (micro-) stripline, or any other type of transmission line which uses a dielectric.

BACKGROUND OF THE INVENTION

Conventional coaxial cable comprises a core containing an inner conductor and a dielectric, and a conductive sheath surrounding the core, wherein the sheath serves as an outer conductor. The dielectric is positioned between the inner conductor and outer conductor.

Other transmission lines belong to the class of striplines and its derivatives such as the coplanar line and the microstripline. This class is characterized by a single conductor and one or more ground planes or grounded lines in a planar configuration. The signal travels through the dielectric space defined by these different lines and planes. The dielectric may be homogeneous or consist of different materials, including air.

Various polymeric materials have been used as the primary dielectric material in transmission lines.

One common type of dielectric is polyolefin foam. However, this dielectric is disadvantageous in that dissipation in the dielectric results in signal attenuation. The dielectric losses are a function of the dissipation factor of the polymer, the density of the foam, and the frequency of the signal.

Recently, improvements have been made in polymer foam technology allowing for improved properties of foam which may be used as a dielectric in transmission lines. For example, the MuCell® process of Trexel, Inc. achieves a uniform cell structure having a very small cell size, not more than 100 $\mu$m, and frequently not more than 60 $\mu$m. The MuCell® process for making microcellular foam is disclosed in U.S. Pat. No. 5,866,053 ("Park"), herein incorporated by reference. In this process, an extrusion system is used to provide the foamed material. The extrusion system involves a supplying plastic pellets which are melted, and also a blowing agent. Specifically, Park uses a supercritical fluid, such as carbon dioxide in the supercritical state, as the blowing agent, to foam a single polymer. In the extruder, the supercritical fluid (carbon dioxide) is dissolved into the molten plastic. The resulting material is then foamed in an expansion stage where a thermodynamic instability is caused by a rapid pressure drop.

In more detail, Park describes an extrusion system for providing a foamed plastic polymer, where a polymer is supplied to an extruder for movement through a rotating screw member. The material is placed in a molten state, and a blowing agent, such as a supercritical fluid, is introduced into the extruder at a selected pressure so that a two-phase mixture of the molten material and the blowing agent is formed. The blowing agent is then diffused into and dissolved in the molten material to form a single-phase solution, which is forwarded from a solution formation area to a nucleation device. Thermodynamic instability is induced through a rapid pressure drop. In a preferred embodiment, a pressure drop greater than 0.9 GPa/s occurs in the nucleation device to nucleate microcells in the solution. A further shaping device, e.g., a die, can be used to produce a foamed material of a desired shape. For further information regarding this process, see <http://www.trexel.com/descript.html>.

By using a polymer alloy which demonstrates high melt strength, superior electric dissipation properties and a glass transition temperature outside the temperature range of −40° C. to 100° C., the low-density foamed dielectric of the present invention is both thermally stable over an extended temperature range and results in extremely low signal attenuation.

U.S. Pat. No. 6,037,545 ("Fox"), herein incorporated by reference, describes a coaxial cable with a foam dielectric. The polymer alloy of the polymer foam is described as a blend of high- and low-density polyethylene. Further, a blowing agent is used in combination with an exothermic nucleating agent, such as azodicarbonamide and an endothermic nucleating agent, such as sodium carbonate/citric acid. The foams described in Fox have densities of between 0.22 g/cm$^3$ and 0.17 g/cm$^3$. However, the foam dielectric of Fox is disadvantageous because foam densities below 0.17 g/cm$^3$ may suffer structural instability and cannot be readily achieved.

The present invention, which uses a combination of a polymer alloy and a supercritical fluid foaming agent, by comparison, can achieve a density as low as about 0.02 g/cm$^3$. In a preferred embodiment of the present invention, the foamed dielectric has a density of from about 0.02 g/cm$^3$ to about 0.20 g/cm$^3$. This translates into superior attenuation properties while preserving favorable structural properties.

SUMMARY OF THE INVENTION

An object of the present invention is to provide a foam dielectric which results in substantially less signal attenuation.

Another object of the present invention is to provide a foam dielectric which has a low foam density.

Still another object of the present invention is to provide a transmission line containing a foam dielectric.

These and other objects of the present invention, which will be apparent from the detailed description of the invention provided hereafter, have been met by a dielectric comprising a foamed polymer alloy obtained by using a supercritical fluid as a foaming agent.

In another embodiment, the above-mentioned objects of the present invention are met by a transmission medium comprising the above-disclosed foam dielectric.

In still another embodiment, the above mentioned objects have been met by a process for providing a foam dielectric comprising feeding a polymer alloy into an extruder; heating said polymer alloy; feeding a supercritical fluid into said extruder; mixing said polymer alloy and said supercritical fluid; exiting the resulting polymer alloy and supercritical fluid mixture from said extruder; and foaming said mixture.

BRIEF DESCRIPTION OF THE DRAWINGS

FIG. 9 is a schematic of the die tooling applied to the extruder cross head used in the process of the present invention.

DETAILED DESCRIPTION OF THE INVENTION

Figure 1:
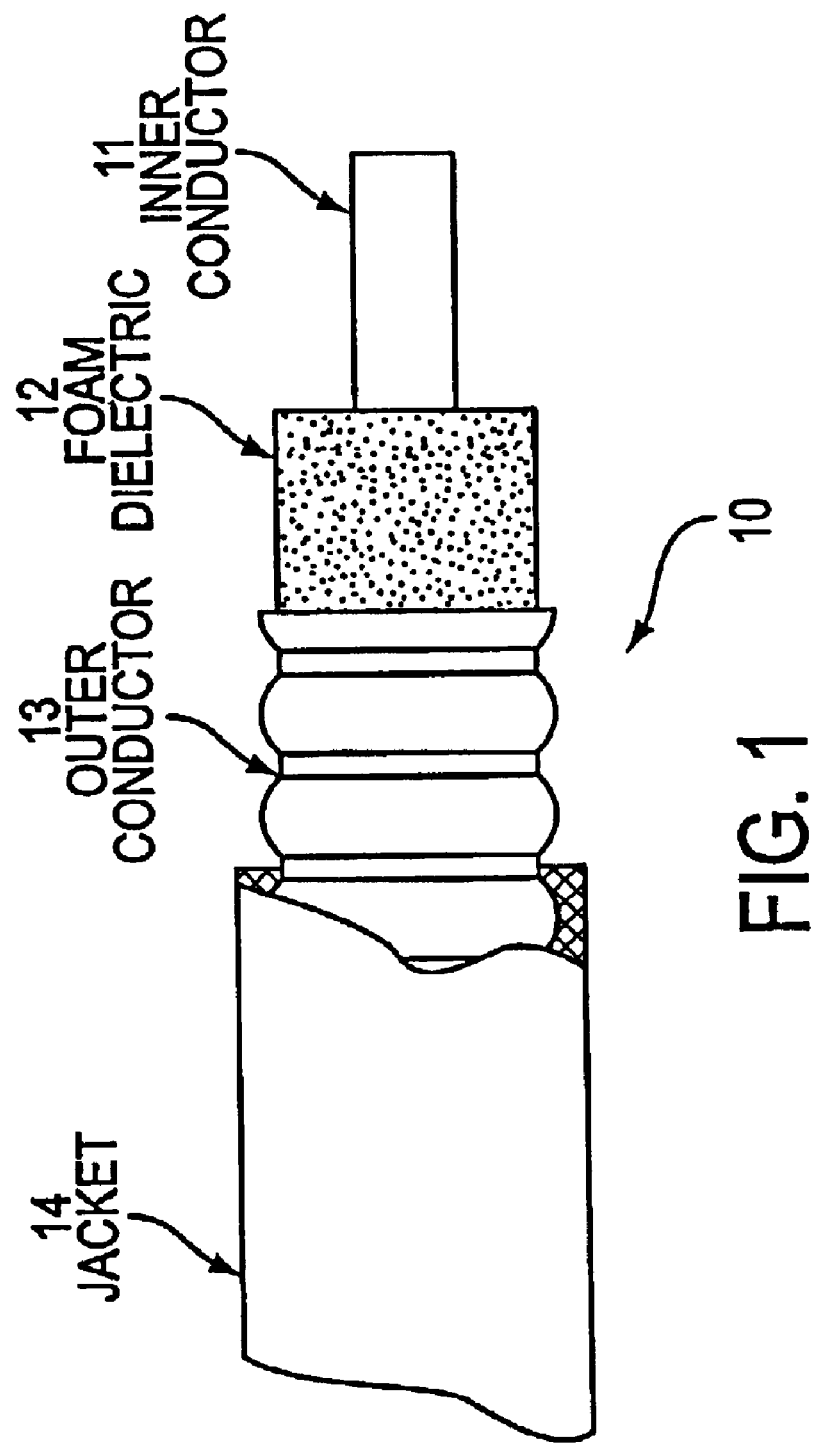
FIG. 1 is a cross-sectional view of a section of coaxial cable incorporating a foamed polymer alloy dielectric.

As discussed above, in one embodiment of the present invention, the above mentioned objects of the present invention have been met by a foam dielectric comprising a foamed polymer alloy obtained from using a supercritical fluid.

The particular polymer alloy employed is not critical to the present invention. Examples of polymer alloys which can be employed in the present invention include combinations of amorphous resins and polyolefins, more particularly combinations of amorphous resins and semi-crystalline polyolefins.

The polymer alloy preferably has a glass transition temperature outside the range greater than 100° C., and a melt index of between 0.6 and 9. More preferably, the polymer alloy is Hivalloy™, from Basell, N.V. (Hoeksteen 66,2132 MS, Hoofddorp, The Netherlands). Most polymer materials used to make foam dielectrics found in the prior art are unsuitable because they have a glass transition temperature within the range between about −40° C. and about 100° C. When foamed, and subjected to a heat-aging test, these materials will undergo a phase transformation (at or around the glass transition temperature) that causes outgassing. The result is significant shrinkage and an unfavorable increase in density.

On the other hand, Hivalloy™ is thermally stable over the temperature range of −40° C. and about 100° C. In a preferred embodiment it has a melt index between 0.6 and 9. In addition, melt indexes outside this range are achievable. A particular grade of Hivalloy™, Hivalloy G2120, was tested to standard ASTMD 1238 and had a melt index of 5.

The Hivalloy™ G2120 used in one embodiment of the present invention comprises:

(1) about 20 to about 80 weight % polypropylene-grafted—polystyrene (PP-g-PS) containing about 5 to about 70% styrenic monomer;

(2) about 20 to about 80 weight % polyethylene, polypropylene or ethylene-propylene copolymer, preferably high molecular weight polypropylene, or modified polypropylene (such as ethylene-propylene impact modified polypropylene, comprising 14% rubber and 8.5% ethylene);

(3) less than about 30 weight % rubber modifier(s), such as high impact polystyrene (e.g. Dow 478 HIPS, Dow Chemical Co.), and/or hydrogenated styrene isoprene diblock copolymer (e.g., Kraton G1702 by Shell Chemical Co. with 37% styrene, 63% rubber), and/or styrene butadiene styrene tri-block copolymers, and/or hydrogenated styrene butadiene styrene copolymers (e.g., Kraton G 1651/1652 by Shell Chemical Co. with 29% styrene and 71% rubber), or blends thereof; and (4) less than about 5 weight % of stabilizers, such as antioxidants (e.g., Irganox 1010, a phenolic stabilizer from Ciba Geigy, or P-EPQ, a phosphonite stabilizer from Sandoz and Ciba-Geigy) and metal deactivators (e.g., Organic complexes containing nitrogen or sulfur, amines, sulfides and phosphates; a specific example is ethylenediaminetetraacetic acid).

The particular foaming agent employed is not critical to the present invention. Preferably, the foaming agent is a supercritical fluid, such as supercritical carbon dioxide, or supercritical nitrogen. Supercritical carbon dioxide is especially preferred. However, one skilled in the art could substitute any other suitable supercritical fluid for supercritical carbon dioxide. For example, nitrogen or other suitable gases can be used as the supercritcial fluid.

The dielectric foam has a density not more than about 0.20 g/cm$^3$, and preferably ranging from about 0.03 to about 0.20 g/cm$^3$, even more preferably from about 0.03 to about 0.08 g/cm$^3$, and a suitably small dissipation factor at 2 GHz.

The cell size of the foam is ordinarily not more than 100 $\mu$m, and preferably not more than 60 $\mu$m. Cell sizes have been measured as low as about 10 $\mu$m. In addition, the wall thickness can be less than 1 $\mu$m. Another property of the foam is that the cells are closed cells and the cell size of the foam is substantially uniform. Using closed cells prevents fluids from escaping or entering the cell. However, a small amount of fluid can still enter and leave the cell through diffusion through the cell's membrane, though this amount is negligible In another embodiment, the above mentioned objects of the present invention have been met by a transmission line comprising the foam dielectric. The type of transmission line employed is not critical to the present invention. Examples of such transmission lines which can be used in the present invention include coaxial cable, stripline, and other transmission lines.

In a preferred embodiment, the coaxial transmission line comprises an inner conductor surrounded by foam dielectric, wherein the foam dielectric comprises a polymer alloy foam obtained from using a supercritical fluid; and an outer conductor surrounding the foam dielectric. The foam dielectric contains polymer alloy and entrapped gas resulting from the supercritical fluid.

Coaxial cables having an impedance of 50 ohms have been produced using the present invention. However, other transmission lines can be produced using the present invention. These transmission lines can be used with cable television, with instrumentation, with radar and a host of other applications in which coaxial cables are used.

In still another preferred embodiment, the stripline transmission line comprises an inner conductor having the above discussed foam dielectric comprising a polymer alloy and entrapped gas resulting from the supercritical fluid disposed on opposite sides of the inner conductor, wherein the foam dielectric is disposed between upper and lower ground planes, and a jacket surrounds the ground planes.

In another embodiment, the above mentioned objects of the present invention have been met by a process for providing the dielectric foam, comprising the steps of:

(A) feeding a polymer alloy into an extruder and heating the polymer alloy, (B) feeding a supercritical fluid into the extruder, (C) mixing the polymer alloy and the supercritical fluid, (D) exiting the polymer alloy and the supercritical fluid from the extruder, and (E) passing the polymer alloy and the supercritical fluid through a crosshead.

In a preferred embodiment of the above process, a polymer alloy, preferably Hivalloy™ is fed into the extruder, where the resin is melted. Processing variables may be varied to accommodate various polymer alloys, foaming agents, or processing conditions. The extruder used is preferably a single screw 2-½" extruder with a length to diameter ratio of 36-to-1. The extruder may be water cooled with cast aluminum heaters and can be equipped with high- or low-output extruder screws. The extruder preferably has dual injection ports and gas injection nozzles. The load pressure preferably falls within the range of approximately 2300–5000 psi with a weight percentage of gas ranging from about 3% to about 8%. Material output is preferably about 5–80 pounds per hour.

In a preferred embodiment, the foaming agent, which may be supercritical carbon dioxide, is injected into the melt under pressure, dissolving into the resin, which solution then flows into a crosshead, which diverts the flow and distributes the molten material around a wire or tube. In this embodiment, when the solution of supercritical carbon dioxide in Hivalloy™ is exposed to lower pressure, the carbon dioxide comes out of solution. More particularly, the supercritical carbon dioxide loses its solubility and changes from the supercritical state to a gaseous state. This results in a light Hivalloy™ foam. Preferably, payout, take-up, and capstans manage wire and tube constituents of the coaxial cable, ensuring that the wire and tube are pulled through the crosshead at a constant velocity and tension. The foam may be cooled in a water trough. In the example of a coaxial cable, the result is a cylindrical foam dielectric core with the inner conductor centered within the foam. An outer conductor may be applied over the foam, completing the manufacture of the coaxial cable. While this is one preferred embodiment of the disclosed process, one of ordinary skill in the art would understand that the variables may be modified and optimized to accommodate different materials and flow rates.

For instance, to achieve the desired flow rates, the solubility of the foaming agent in the polymer melt is estimated at the processing pressure and temperature used at such stage. Preferably, only a soluble amount of foaming agent need be injected into the polymer melt stream, since an excessive amount thereof would result in the formation of undesirable voids in the polymer melt. The existence of such voids prevents homogeneous nucleation at a later stage because the foaming agent molecules prefer to diffuse to larger cells, which results in the formation of hollow cavities in the final product. In general, the solubility of a foaming agent such as a supercritical fluid in a polymer changes with the temperature and pressure. For example, at 200° C. and 27.6 MPa (4,000 psi), which represent a typical processing temperature and pressure, the solubility of carbon dioxide in most polymers is approximately 10% by weight, while that of nitrogen under the same conditions is about 2% by weight.

In a preferred embodiment, a method of making a coaxial transmission line using the dielectric foam of the present invention is disclosed. The method comprises using a microcellular process. In addition, a polymer alloy and supercritcial fluid mixture is foamed around an inner conductor. Further, a second conductor is applied around the foamed dielectric.

In still another preferred embodiment, a method of making a stripline transmission line using the dielectric foam of the present invention is disclosed. The method comprises using a microcellular process. It further comprises the additional steps of shaping the extruded foam into at least one sheet having opposite sides, attaching one of the opposite sides onto a conductor, attaching a strip of a second conductor onto another of the opposite sides of said sheet, attaching a second sheet on top of the strip of the second conductor; and attaching a third conductor on top of the second sheet.

The above embodiments and other embodiments are further described by the drawings.

FIG. 1 illustrates coaxial cable 10 incorporating the foam dielectric of the present invention. FIG. 1 shows a conventional coaxial cable, cutaway to expose the various layers. The coaxial cable comprises an inner conductor 11 located at the center of the coaxial cable. In the illustrated embodiment, the conductor 11 is smooth; however, the conductor 11 can be corrugated. Surrounding the inner conductor wire 11 in a cylindrical manner is microcellular foam dielectric 12 which is produced by extruding a polymer alloy with a supercritical fluid such as carbon dioxide. It is known in the art that one or more adhesive layers may be placed around the inner conductor wire 11, the foam dielectric 12, or other constituents of the coaxial cable. The adhesive may be coextruded with the foam dielectric layer, or extruded separately onto the foam dielectric and/or the inner conductor.

An outer conductor 13 is positioned around the foam dielectric 12. In the illustrated embodiment, the conductor 13 is corrugated, however, it is not necessary that the conductor 13 be corrugated. In an alternative embodiment, the outer conductor shell 13 is a non-corrugated conductor. A cable jacket 14 surrounds the outer conductor.

The polymer alloy used to make the foam dielectric 12 is preferably foamable to a sufficiently low density. In a preferred embodiment, the density is about 0.08 g/cm$^3$ or less. Dielectrics with densities of from about 0.03 to about 0.20 g/cm$^3$ have been produced. In addition, the melt strength of the polymer alloy is able to withstand the extrusion process. Also, the polymer alloy is mechanically and thermally stable between the temperatures of about −40° C. and about 100° C.

Figure 2:
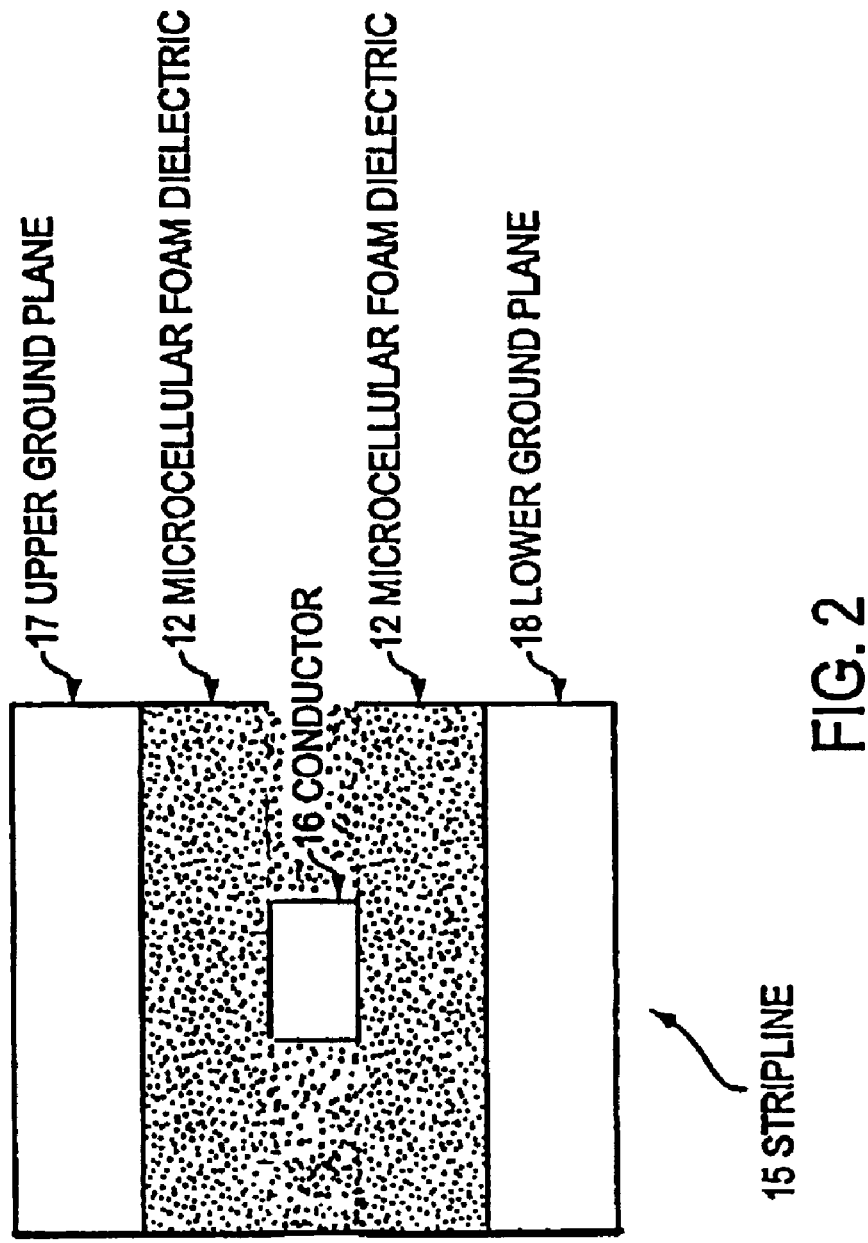
FIG. 2 shows a stripline transmission line fabricated using the foam dielectric of the present invention.

FIG. 2 shows a stripline transmission line 15 fabricated using the foam dielectric 12 of the present invention. It consists of a conductor 16 and a microcellular foamed dielectric 12 of the present invention disposed on opposite sides of the conductor 16. In addition, it also comprises an upper 17 and a lower ground plane 18. The foamed dielectric 12 is disposed between the upper 17 and the lower ground plane 18. The entire stripline arrangement is covered with a jacket 19. Typically, stripline transmission lines or stripline cables have impedances of 50 ohms or 75 ohms. However, other impedances can be produced using the present invention. These stripline cables can be used with cable television, with radar, with instrumentation, and a host of other applications in which striplines are used.

Figure 3:
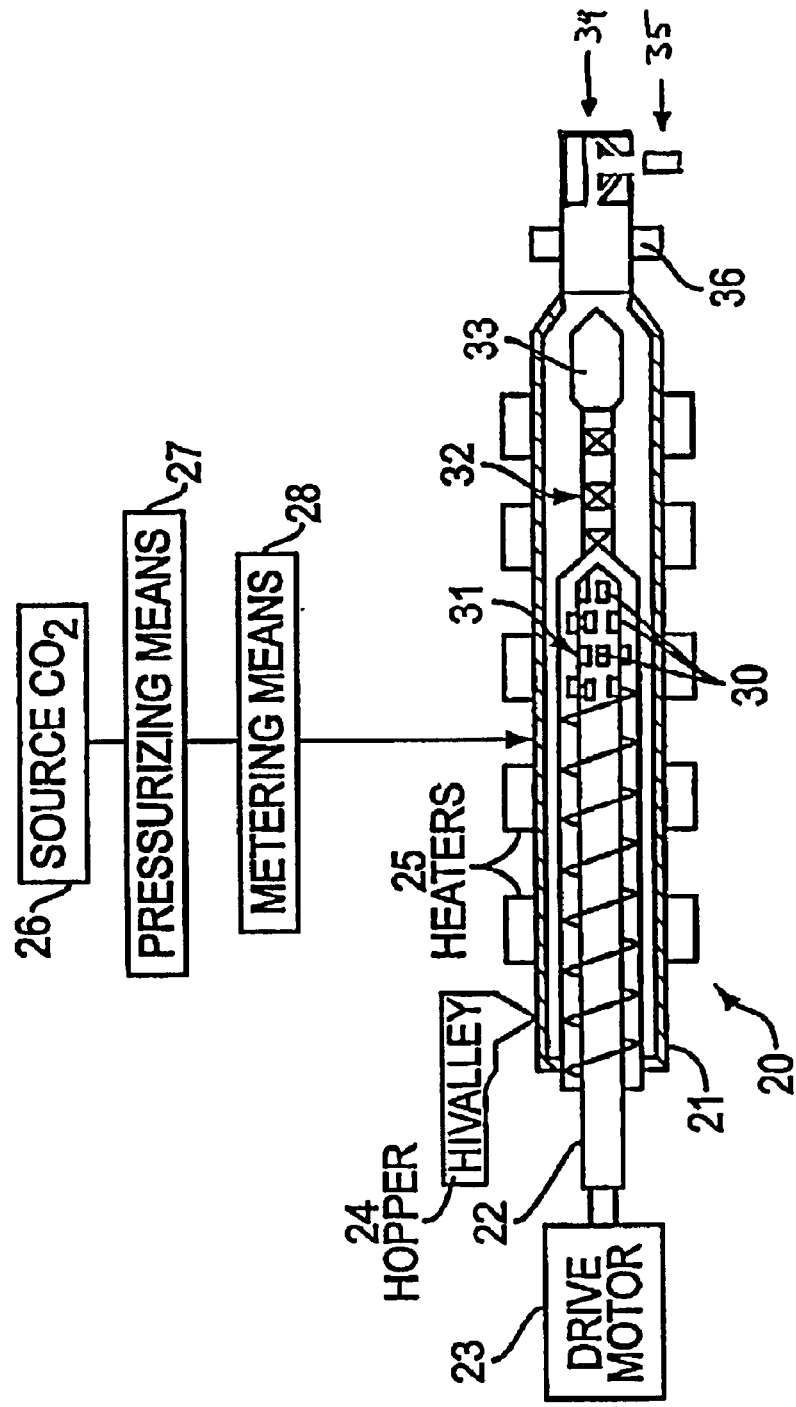
FIG. 3 shows a supercritical fluid extrusion apparatus which is used in the example provided herein.
Figure 4:
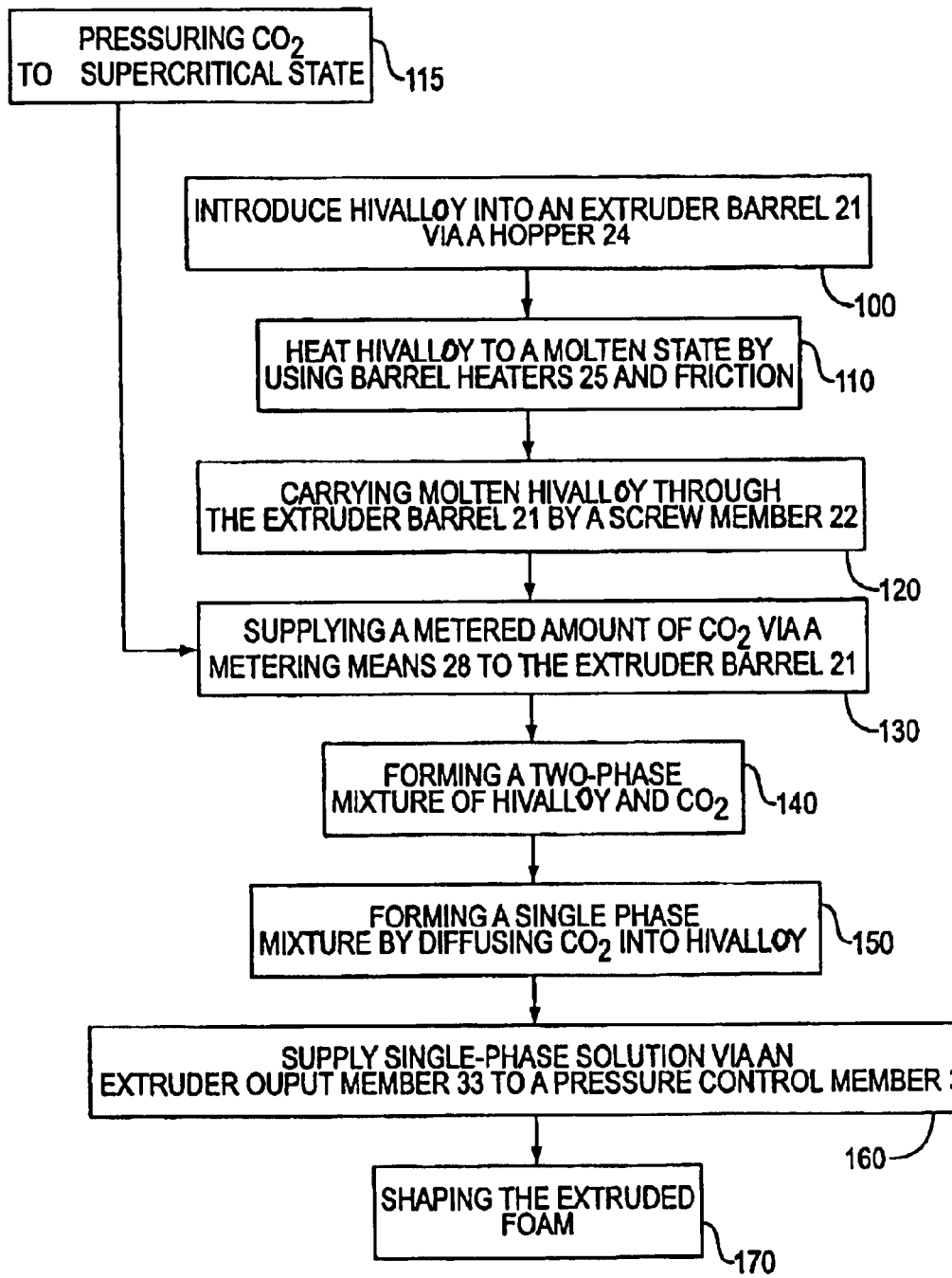
FIG. 4 is a flowchart of the various processing steps incorporated into the present invention.

FIG. 3 shows the supercritical fluid extrusion apparatus and FIG. 4 shows the supercritcial fluid extrusion process which have been incorporated into the present invention. The process for production of the dielectric foam of the present invention (or supercritical process) involves an extruder 20 and supercritical fluid injectors.

Further detail is provided in FIGS. 3 and 4. The extruder 20 includes an extruder barrel 21 having a rotating screw member 22 suitably mounted therein, the rotation thereof being produced by an appropriate drive motor 23. A plurality of pellets of a material to be foamed, e.g. a polymer plastic material (such as Hivalloy™), are introduced into the extruder barrel 21 via a hopper 24 (Step 100). Extruder barrel 21 has a plurality of barrel heaters 25 mounted thereon to heat the barrel. Hence, the polymer pellets are heated therein to a molten state (Step 110) both by friction due to the mechanical shear forces on the material produced by the rotating screw member 22 and by the heated barrel as the pellets are carried through the barrel by screw member 22.

A supercritical fluid, such as carbon dioxide from a source 26 thereof is delivered at a selected pressure (Step 115), by a suitable means 27, and a metered amount thereof is supplied at a controlled rate via a metering means 28 to the extruder barrel 21 (Step 130). This results in the formation of a two-phase mixture (140), existing at a high pressure within the extruder barrel 21. The location of the supercritical fluid injection can be suitably selected to occur at a location along the barrel such that proper melting, shearing, and pressurization of the polymer melt are achieved before the gas is introduced.

In the particular embodiment described, the two-phase mixture of supercritical fluid and polymer material that results is then further homogenized by shear forces thereon using a plurality of irregular blades 30 machined into a portion 31 of extruder screw 22 within extrusion barrel 21. Alternatively, in some applications, the mixing process which occurs when using a standard extrusion screw can be sufficient to provide the desired mixture without the need for the irregular blades 30. The dynamically mixed melt can then be supplied to a plurality of static mixers 32 where additional agitation can be incorporated as required. As a result the supercritical fluid diffuses and dissolves into the polymer material so as to form a single-phase solution thereof (Step 150). In most embodiments, passage of the mixture through a barrel which does not use the static mixers provides sufficient diffusion and dissolution to form the desired single-phase solution. The single-phase solution is supplied via the extruder output, in some embodiments including a breaker plate, to a cross head 34 (Step 160) at a selected temperature which is maintained by appropriate temperature control elements 36. The pressure drops rapidly in the cross head 34 to produce microcellular nucleation. The tip-and-die combination in the cross head can be used to produce a foamed material of a desired shape, e.g., a sheet, a filament, or to wrap the foam around an inner conductor, etc. (Step 170). Subsequent to the shaping process, where limited expansion has previously occurred, the material will then become fully expanded. In some embodiments a shaping die 35 is then used to further smoothen the surface of the expanded foam.

In order to produce a consistent foamed product, the flow rates of the foaming agent, e.g., a supercritical fluid, and the polymer streams introduced in extrusion barrel 21 need to be controlled in order to achieve a constant weight ratio. The polymer flow rate is controlled primarily by the rotational speed of the extruder screw 22. The metering of the flow of a foaming agent such as a supercritical fluid, for example, is achievable by using a suitable supercritical plant including a metering valve which in its turn may be feedback controlled.

Conventional cable processing equipment is used including payout, take-up, capstans, an extruder, and, in some embodiments, a water trough.

The internal components of the cross head 35 are more clearly depicted in FIG. 9, showing a cross-section of the die and tip combination. The die diameter 35a is the opening from which the foamed dielectric emerges. The die has a die primary angle 35b and a die secondary angle 35c. The convergence angle 35e and incidence angle 35d determine the flow profile as the homogeneous mixture is applied to the center conductor. The tip has an inside diameter 35g and a tip angle 35f. One of ordinary skill will appreciate that these parameters may be adjusted depending on the specific size, shape, and density of the extruded foam.

Figure 5:
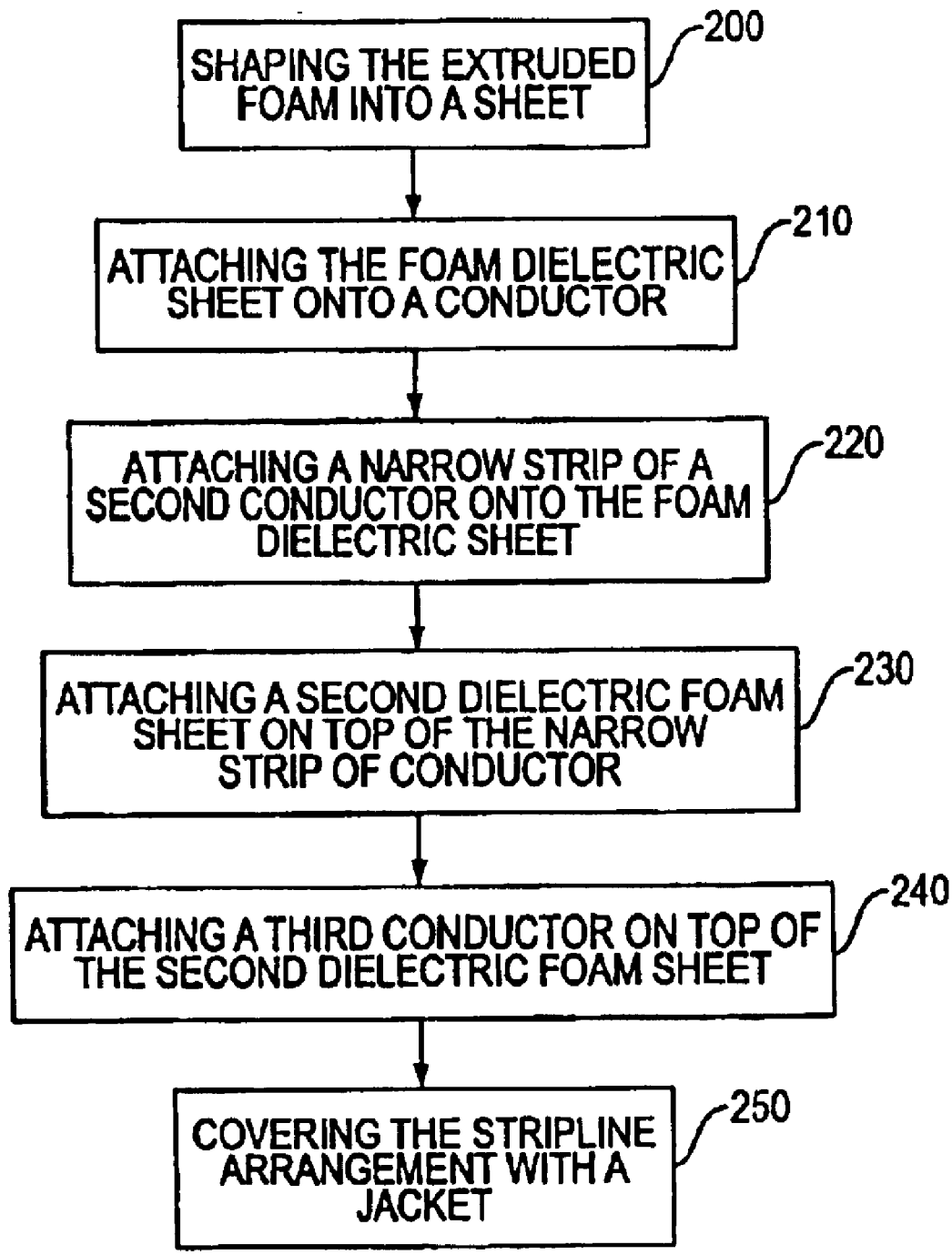
FIG. 5 is a flowchart of the processing steps used to produce a stripline cable.

FIG. 5 illustrates the steps taken to produce a stripline cable after the foam dielectric 12 is shaped into a sheet. More specifically, the shaping member 35, preferably a crosshead (or die) with proper tooling, allows the extruded foam to form a sheet. (Step 200) The sheet 12 is placed upon or attached to a conductor 18 (which serves as a ground plane) also shaped as a sheet (Step 210). Next, a narrow strip of a second conductor 16 is placed on or attached to the top of the foam dielectric sheet 12 (Step 220). A second dielectric foam sheet 12 is then placed on or attached to the top of the narrow strip of conductor (Step 230). Then a third conductor 17 (which also serves as a ground plane and is also shaped as a sheet) is placed on or attached to the top of the second dielectric foam sheet 12 (Step 240). The stripline arrangement is then covered with a jacket 19 (Step 250).

The following example is presented for illustrative purposes only, and is in no way intended to limit the scope of the present invention.

EXAMPLE

The following Example is one embodiment of the present invention where an embodiment of the foam dielectric, disclosed in the preceding detailed description, is used to manufacture an improved 7/8" coaxial cable exhibiting improved properties with respect to signal attenuation and dielectric density.

In this Example, Hivalloy™ G 2120 was foamed using supercritical carbon dioxide.

The extruder used was a single screw 2½" extruder with a length to diameter ratio of 36-to-1. The extruder was water cooled with cast aluminum heaters and could be equipped with high- or low-output extruder screws. The extruder featured dual injection ports and gas injection nozzles. The load pressure applied was approximately 2300–5000 psi with a weight percentage of gas ranging from 3% to 8%.

The polymer alloy was fed into the extruder where it was heated. Supercritical carbon dioxide was metered and introduced into the extruder, where it was mixed with the polymer. The mixture was extruded through a crosshead onto the inner conductor. Material output was about 5–80 pounds per hour. The extruder tooling configuration used is shown in FIG. 9.

The temperature profile of the extruder ranged from 182° C. to 160° C. with a die temperature of 156° C. The die had a 0.440" inside diameter and a 0.900" outside diameter, with dual angles of 10 and 20 degrees. The die tip had an inside diameter of 0.391". The screw operated at 40 rpm, and the linespead of the process was 23 ft/min.

Payout, take-up, and capstans manage wire and tube constituents of the coaxial cable, ensuring that the wire and tube were pulled through the crosshead at a constant velocity and tension. The result was a cylindrical foam dielectric core with the inner conductor centered within the foam. An outer conductor was applied over the foam, completing the manufacture of the coaxial cable.

The mean cell size of the foam dielectric was about 50–60 μm, and the density was about 0.065 g/cm$^3$.

A sample of the coaxial cable was taken after cooling and tested for signal attenuation using a mobile cable test system manufactured by Hewlett-Packard, the HP8753. Over a range of signal frequencies, signal attenuation was determined as listed in the chart below.

The same attenuation test was performed on a section of cable containing foamed polyethylene according to the process disclosed in Fox. A supercritical blowing agent was not used in this Comparative Example, because the solubility of supercritical carbon dioxide in polyethylene resulted in a foam of 0.50 g/cm$^3$, a density approximately three times greater than that of conventionally foamed polyethylene.

Figure 6:
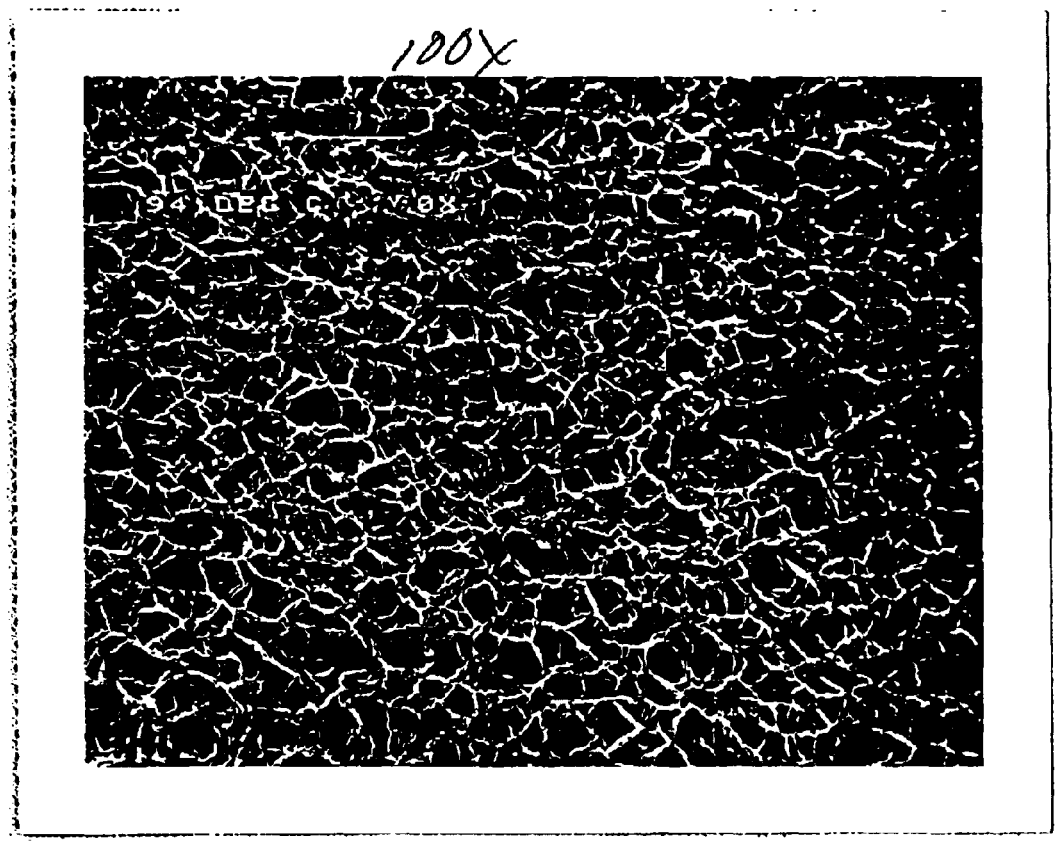
FIG. 6 is a photomicrograph of foam dielectric of the present invention magnified to a power of 100×.
Figure 7:
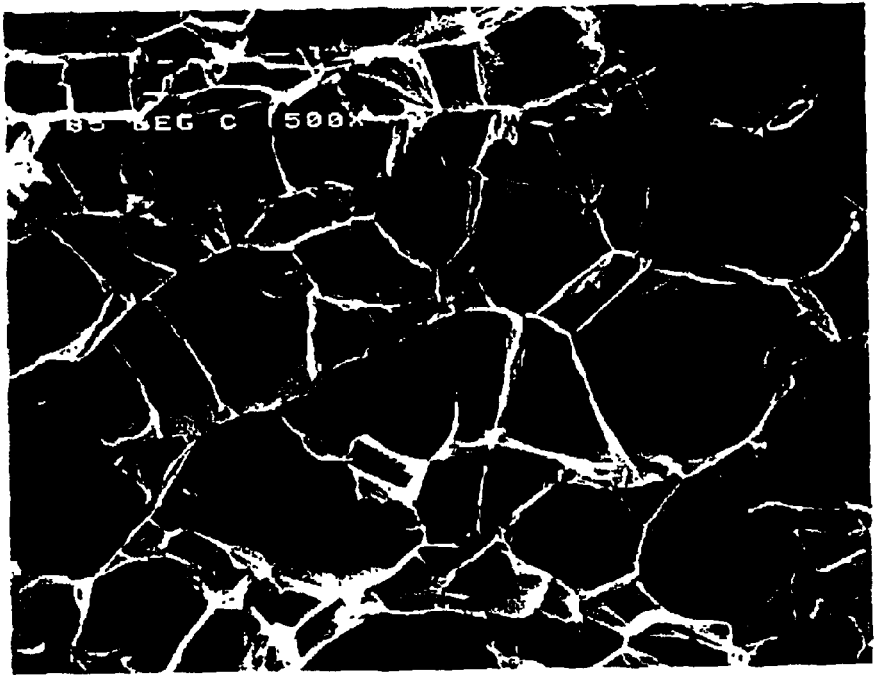
FIG. 7 is a photomicrograph of foam dielectric of the present invention magnified to a power of 500×.
Figure 8:
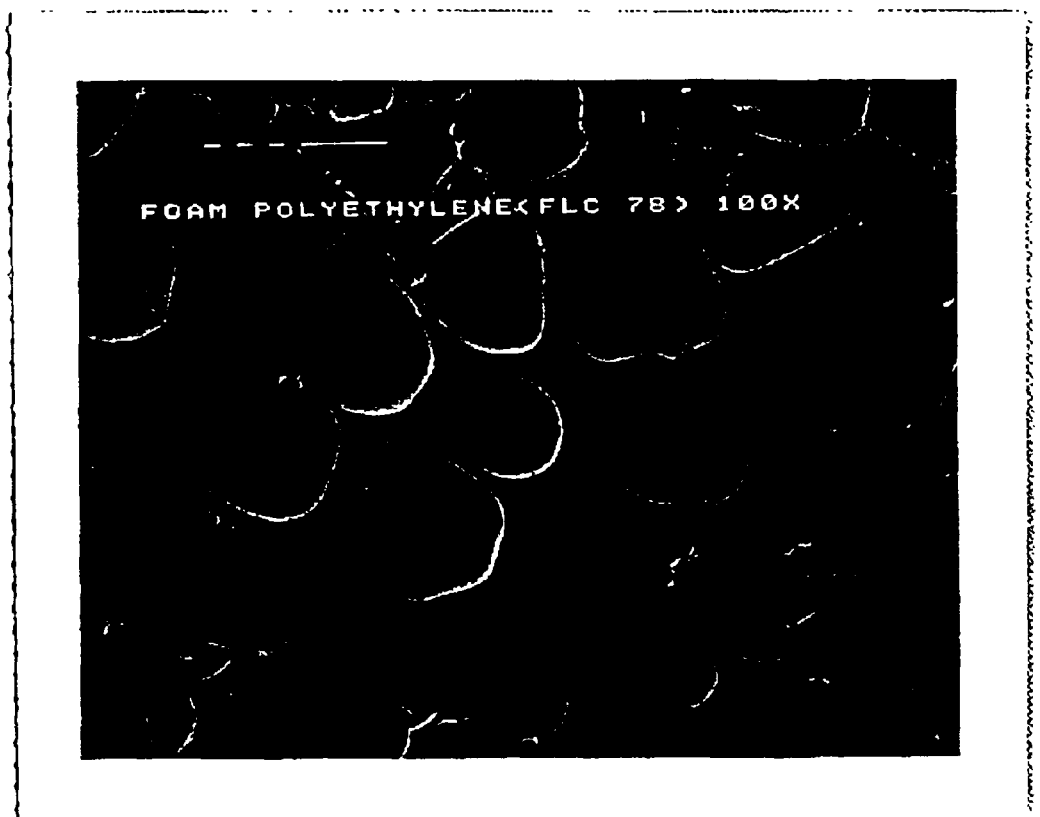
FIG. 8 is a photomicrograph of prior art foamed polyethylene magnified to a power of 100×.

FIG. 6, FIG. 7, and FIG. 8 are photomicrographs of samples of foamed polymer. FIG. 6 and FIG. 7 correspond to the Example of the foam dielectric of the present invention, and FIG. 8 is a sample of foamed polyethylene of the Comparative Example, representing a foam dielectric of the prior art.

FIG. 6 is a photomicrograph taken at a magnification of 100× showing the cell geometry of one embodiment of the present invention.

FIG. 7 is a photomicrograph more clearly depicting an embodiment of the present invention, taken at a magnification of 500×.

FIG. 8, for comparison, is a photomicrograph of the closest known suitable foam dielectric, foamed polyethylene, representative of the foam disclosed in the Fox patent. As will be apparent to one skilled in the art, the apparent cell size of the foamed polyethylene at a magnification of 100× is approximately the same as the apparent cell size of the microcellular foam at a magnification of 500×. Because of the five-fold difference in magnification between the photomicrographs of FIG. 7 and FIG. 8, this represents at least a five-fold decrease in the cell size of the present invention, as compared to the closest prior art.

As will be apparent from a comparison of the photomicrographs, the foam of the Comparative Example has a much larger cell size, with thicker cell walls, as compared to the foam of the present invention. Accordingly, the foam of the Comparative Example has a greater density than the foam of the present invention. The higher density of the foam of the Comparative Example corresponds to a greater dissipation factor, and ultimately, greater signal attenuation when incorporated into a transmission line. The results of the attenuation testing of the conventionally foamed polyethylene appear in Table 1 below. Both sets of data refer to 7/8" cable.

TABLE 1

| Frequency (MHz) | Attenuation (dB/100 ft) THIS INVENTION | Attenuation (dB/100 ft) COMPARATIVE EXAMPLE |
|---|---|---|
| 500 | 0.77 | 0.85 |
| 1000 | 1.11 | 1.25 |
| 1500 | 1.39 | 1.57 |
| 2000 | 1.63 | 1.86 |
| 2500 | 1.85 | 2.12 |
| 3000 | 2.05 | 2.36 |

As shown by the data in Table 1, the present invention yields excellent signal attenuation properties. By comparison, coaxial cable produced using foamed polyethylene of the Comparative Example yielded greater signal attenuation at all frequencies.

While the invention has been described in detail and with reference to specific embodiments thereof, it will be apparent to one skilled in the art that various changes and modifications can be made therein without departing from the spirit and scope thereof.

What is claimed is:

1. A transmission line comprising: at least one conductor and at least one dielectric, said dielectric comprising a foamed polymer alloy obtained using a supercritical fluid as a foaming agent, wherein said polymer alloy comprises at least two different polymers or a graft polymer of said polymers; and wherein said polymer alloy has a glass transition temperature greater than 100° C.

2. The transmission line according to claim 1, wherein the foam dielectric has a cell size of not more than 100 μm.

3. The transmission line according to claim 2, wherein the foam dielectric has a cell size of not more than 60 μm.

4. The transmission line according to claim 1, wherein said polymer alloy comprises polypropylene and polystyrene.

5. The transmission line according to claim 1, wherein said polymer alloy comprises:

(1) about 20 to about 80 weight % polypropylene-grafted-polystyrene containing about 5 to about 70% styrenic monomer;

(2) about 20 to about 80 weight % of an olefinic polymer selected from the group consisting of polyethylene, polypropylene or ethylene-propylene copolymer;

(3) less than about 30 weight % of a rubber modifier; and (4) less than about 5 weight % of a stabilizer.

6. The transmission line according to claim 5, wherein said olefinic polymer is a member selected from the group consisting of high molecular weight polypropylene, modified polypropylene, and ethylene-propylene impact modified polypropylene comprising about 14% rubber and about 8.5% ethylene.

7. The transmission line according to claim 5, wherein said rubber modifier is a member selected from the group consisting of high impact polystyrene, hydrogenated styrene isoprene diblock copolymer, styrene butadiene styrene triblock copolymers, and hydrogenated styrene butadiene styrene copolymers.

8. The transmission line according to claim 7, wherein said hydrogenated styrene isoprene diblock copolymer comprises 37% styrene and 63% isoprene, and said hydrogenated styrene butadiene styrene copolymer comprises 29% styrene and 71% butadiene.

9. The transmission line according to claim 5, wherein said stabilizer is a member selected from the group consisting of antioxidant and a metal deactivator.

10. The transmission line according to claim 9, wherein said antioxidant is a member selected from the group consisting of phosphonite stabilizers and phenolic stabilizers.

11. The transmission line according to claim 9, wherein said metal deactivator is ethylenediaminetetraacetic acid.

12. The transmission line according to claim 1, wherein said supercritical fluid is supercritical carbon dioxide.

13. The transmission line according to claim 1, where the foam dielectric has a density of not more than about 0.2 g/cm$^3$.

14. The transmission line according to claim 13, wherein the foam dielectric has a density of about 0.03 g/cm$^3$ to about 0.2 g/cm sup$^3$.

15. The transmission line according to claim 14, wherein the foam dielectric has a density of about 0.03 g/cm$^3$ to 0.08 g/cm$^3$.

* * * * *